May 3, 1927.
B. H. SNOW
FURNACE WALL
Filed Feb. 13, 1925
1,627,349
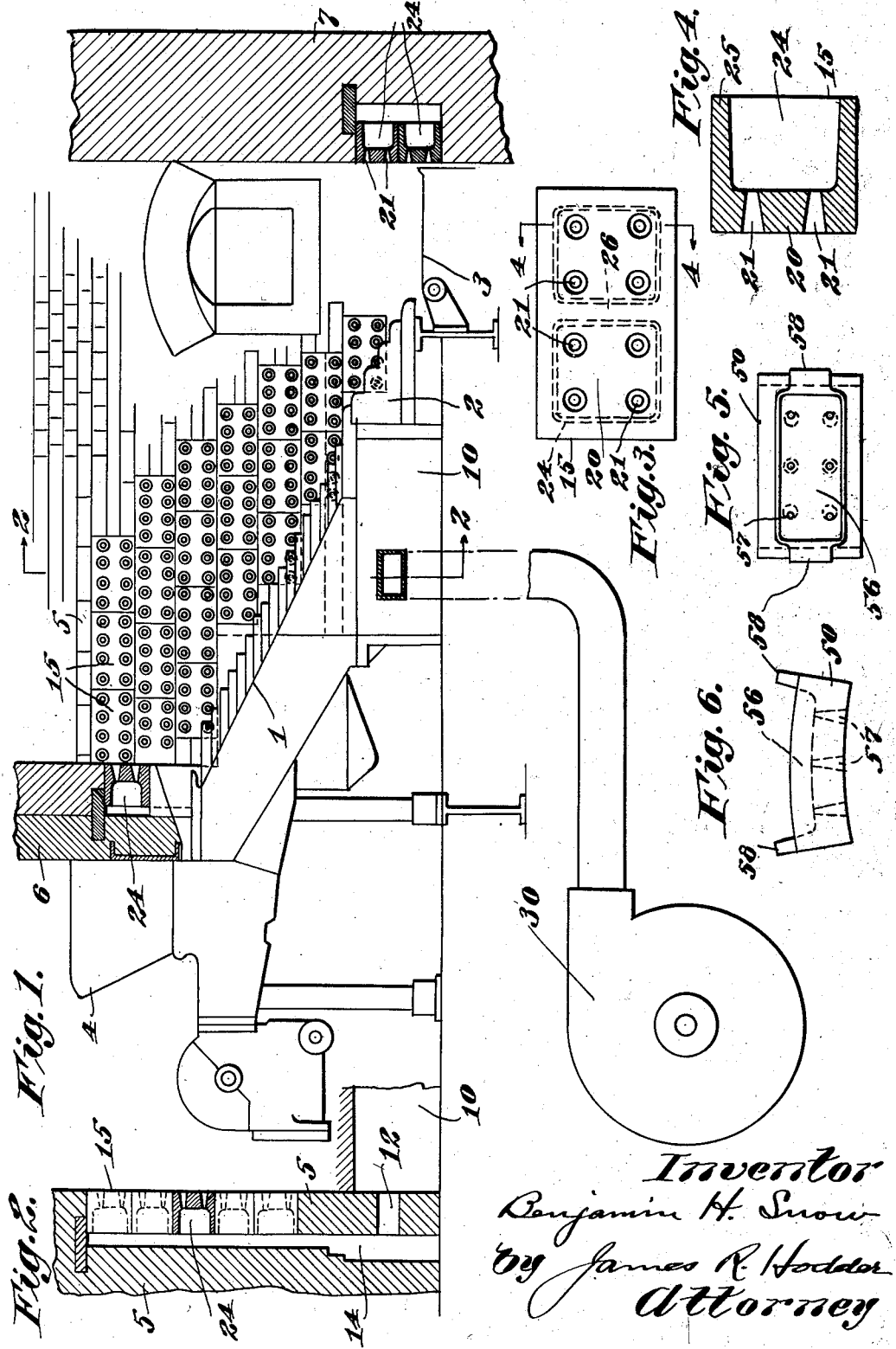
Inventor
Benjamin H. Snow
By James R. Hodder
Attorney Patented May 3, 1927.

1,627,349

UNITED STATES PATENT OFFICE.

BENJAMIN H. SNOW, OF WINCHESTER, MASSACHUSETTS, ASSIGNOR TO BERNITZ FURNACE APPLIANCE COMPANY, OF BOSTON, MASSACHUSETTS, A CORPORATION OF MASSACHUSETTS.

FURNACE WALL.

Application filed February 13, 1923. Serial No. 618,824.

My present invention comprises a novel and improved form of fire resisting block or bricklike structure designed particularly for use in furnace wall building and for cooperating with a source of forced draft air supply.

In furnace wall structures employing the well-known "Bernitz system", illustrated in U. S. Patent No. 1,393,606, to E. Bernitz, a clinker-proof or non-clinkering furnace wall face is employed wherein a large number of relatively small openings through the furnace wall face, and directly into the fuel of the furnace, are provided, receiving air under pressure which tends to cool the furnace wall and the brick or block of which it is built, as well as to stimulate combustion at the wall face and thereby render the brick, block or wall, clinker-resistant to a high degree, or in fact clinker proof. In designing bricks or blocks for such purpose, I have discovered that it is of great importance to so plan, arrange and construct the furnace wall, that the cooling effect of the flow of air under pressure will be utilized to the greatest extent possible. To this end I find it feasible to so form the block or brick as to present a relatively large cooling surface in contact with the air current and also to provide a relatively thin fuel contacting face of the brick or block as thin as the required strength will admit in order to secure the added feature of immediate air cooling adjacent the face of the block and therefore to have said face relatively thin. This cooling feature is of great importance, rendering the actual face or fuel contacting surface of the brick, block or wall, more highly clinker resistant or clinker proof. This added feature is in addition to the effect produced by the large number of air openings through the wall itself permitting substantially a flow of air along the wall face and through the fuel contacting with said face, still further insuring complete combustion of the fuel on the face, and thus reducing the formation of clinkers, as explained in said Bernitz patent. The importance and advantage of this method of eliminating the formation of clinkers is also explained in said Bernitz patent and is of special importance in power plants wherein automatic stokers are employed, which are run night and day with forced draft and with maximum intensity.

In carrying out my invention I find that it is desirable to form a brick or block with a central air receiving area or recess, or a plurality of such recesses, air chambers or enlarged interiors, to be positioned in air receiving relation to the current of forced draft which is to be supplied adjacent the furnace wall and through the wall face in accordance with the principles enunciated in said Bernitz patent.

The formation of bricks or blocks in this manner gives a relatively large air receiving or contacting surface for cooling and the further provision of openings through the relatively thin faces of the brick or block, thus affording a continuous current of relatively cooling air through these recesses, air chambers or spaces, still further aids in maintaining the entire block and the whole furnace wall in comparatively cooled condition, and in combination with the Bernitz system produces an ideal clinker-resistant structure.

In making brick or block and building a furnace wall embodying my invention, I prefer to utilize flaring or conical openings through the relatively thin face portion of the brick or block, flaring or opening toward the fuel and I find that it is desirable also to make such brick or block either of fire clay or other refractory material, particularly carborundum. While my invention is of importance and value when the brick or block formed on the principle above outlined is made of fire clay, yet the relatively thin face is undesirable as not affording sufficient structural strength to certain furnace walls in case of large automatic stoker installation. In utilizing carborundum, however, I secure great strength in a relatively thin face, together with the added advantages of wear-resisting, which is peculiar to carborundum, and which is a feature in brick which are actually in contact with the fuel in an automatic stoker. Furthermore, an important characteristic of my invention when made of carborundum, is that this latter material has a higher thermal-conductivity than the usual fire brick clays. While this characteristic of carborundum tends to carry the heat of the furnace therethrough, it also greatly aids in the converse feature, viz., of carrying through the cooling effect produced by the greater area of air receiving surface, and thus I am actually enabled to positively cool—relatively—the face of the block and wall which is in contact with the fuel by supplying sufficient air under pressure to my novel form of structure.

Further features of the invention, advantages, and important novelties will be hereinafter more fully pointed out and claimed.

Referring to the drawings, illustrating a preferred embodiment of the invention as applied to a furnace block and wall utilized in connection with an automatic stoker.

Fig. 1 is a longitudinal elevation partly in cross-section through the front and bridge walls, illustrating a retort, tuyères and the fuel contacting portion of the furnace wall provided with my invention;

Fig. 2 is a fragmentary cross-sectional view on the line 2—2 of Fig. 1;

Fig. 3 is a front view of my block; and

Fig. 4 is a cross-sectional view through the line 4—4 of Fig. 3.

Figs. 5 and 6 are elevational and plan views respectively of a modified form of my block applied to gas producer furnaces or other circular structures.

It will be appreciated that my present novel form of clinker-proof block may be of any suitable or desirable size or dimensions so far as height and length are concerned. As herein illustrated, the block is shown substantially equal in height to three courses of fire brick, with which the rest of the furnace wall is constructed. The block may also be of a length equal to fire brick or any other desired unit or multiple. This proportion has been found convenient in actual work in connection with the installation of the Bernitz method to which my present invention is peculiarly applicable and therefore is herein illustrated.

As shown in the drawings illustrating installation of a typical automatic stoker, the supporting row of tuyères is designated at 1, the overfeed grate at 2, the dump at 3 and the fuel supply at 4. The side wall is illustrated generally at 5, the front wall 6 and bridge wall 7 being shown partly in cross-section. Under pressure air is supplied to an air chamber 10 underneath the tuyères and from thence through a passage 12 into an air opening 14 in the side wall 5, and similarly by passages to the front and bridge walls. This air passage extends vertically and longitudinally a sufficient distance to cover and supply air to the entire part of the side wall in which it is desired to build the block 15, having the air openings 21 therethrough. These blocks will now be described. As best illustrated in Figs. 3 and 4, my present block consists in a front face 20 pierced by a plurality of air openings 21. These may be of any suitable number, eight being illustrated and are preferably also in conical form, and may be arranged symmetrically as shown. This block is of sufficient height to dovetail in and cooperate with three standard brick courses to facilitate laying up in a wall with standard brick. Each block is also preferably of substantial width at the top 22 and ends. If desired these may be substantially square, but formed in the rear or air receiving surface are one or more open recesses 24. In dotted lines in Fig. 3 I have illustrated the boundaries of these recesses, leaving substantial thickness around the edges as indicated at 25, Fig. 4, including also a central partition 26, where a plurality of air recesses or chambers 24 are employed. In the actual block as shown, and when made of carborundum, the front face, pierced by the openings 21, may be of two and a half inches in thickness. I find that this gives a very substantial structural strength, amply sufficient for the heaviest wall and largest automatic stoker installation. Where fire brick of ordinary refractory clay is employed, a substantially greater thickness would be required. This dimension of greatest thickness, viz., two and a half inches, has a further advantage when carborundum is employed, since this is as heavy or thick a web or face of carborundum as can be advantageously handled, burned and made. My block so formed and built into a wall, as illustrated at the side walls 5 in Fig. 2, the front 6 and bridge wall 7 in Fig. 1, gives sufficient strength throughout the wall structure, while permitting large air receiving and consequently air cooling surfaces to each block 15. Air under pressure from a suitable source of supply 30 and connected with the various air openings through the walls fills the air passages back of the face brick and a constant flow of fresh and relatively cool air is conducted, not only to but actually through each block because of the outlets 21. Thus each block and the entire wall face is subjected to this cooling action, the large recesses 24 permitting air supply, and the relatively thin webs, sides and edges, tops and bottoms of each block, being open to and in contact with this current of air, keeps down the temperature to which the block would ordinarily be raised because of the contacting of the face with the fuel in the furnace. These blocks and the resulting furnace wall will stand a more intense heat, therefore, without danger or difficulty, and yet secures all the advantages of the Bernitz system. A further feature of very great importance, particularly when carborundum is used, is that my blocks are very economical in the material used; are relatively light, permitting ease in handling, economy in shipment, freight, etc.

I believe that the principle of so constructing a furnace wall, and the brick or blocks from which the wall is made, to cooperate with an air current whereby a large mass of the wall structure constitutes an air cooling means, is a distinct novelty in furnace wall structures and I wish to claim the same broadly. I also believe that the formation of faced brick or block or furnace wall structures having one or more recesses, air chambers, openings or the like, saving the amount of material employed, reducing weight and furthermore acting as relatively cooling members in conjunction with the fire face portion of the brick or block, is new and I claim the same broadly. The resulting furnace wall structure and the entire furnace built thereby, is also, I am advised, novel and is claimed broadly herein, as well as the process of so building a furnace wall structure.

I find that my form of block is also of value and importance in connection with gas producer furnaces, or similar circular structures, and therefore I have illustrated in Figs. 5 and 6, a modified form of my block, for use particularly with circular structures such as gas producer furnaces. In this form it is desirable to have the block both spaced front and braced against the surrounding furnace wall, owing to the pressure exerted against the blocks at the fire face. Accordingly and as illustrated in Figs. 5 and 6, I form this block 50 of suitable size, area, and of any desirable contour to fit the circular structure in which it is to be built. This form has the inner recess or recesses 56 corresponding to those designated as 24 in the block already described and is provided with a plurality of openings, preferably flaring outwardly, 57, similar to those 21 heretofore described in connection with the block 15. In addition I form these particular blocks with rearwardly extending lugs 58, preferably arranged centrally and at either end of the block, as clearly shown in Figs. 5 and 6. Thus these blocks can be built into the wall structure, are automatically spaced from the main retaining wall, leaving the air space or passage around the same, and are also braced and strengthened by the lugs 58 bearing against the main retaining wall of the furnace. The provision of building a clinkerproof furnace wall structure in gas producing structures is of great importance, and owing to the intense heat and pressure, my block, particularly when made of carborundum as above explained, presents a substantially clinkerproof construction. While I have illustrated herein a relatively large block provided with a plurality of air passages as a preferred form, yet it will be appreciated that the scope of my invention fully covers the utilization of any size block with one or more air passages which will embody the invention.

My invention is further described and defined in the form of claims as follows:

1. In a furnace, a fuel support, fixed walls for confining the fuel on the support, said walls adajcent to the fuel bed being made of non-metallic refractory blocks, said blocks having enlarged interior air chambers open at the rear or exterior faces thereof, and a conical passage extending from each of said air chambers through the face of the block to the fuel bed and with the larger end of said passages on the side of the block remote from the air chambers.

2. In a furnace, a fuel support, fixed walls for confining the fuel on the support, said walls adjacent to the fuel bed being made of non-metallic refractory blocks, said blocks having enlarged interior air chambers open at the rear or exterior faces thereof, and a plurality of conical passages extending from each of said air chambers through the face of the block to the fuel bed and with the larger end of said passages on the side of the block remote from the air chambers.

3. In a furnace, a fuel support, fixed walls for confining the fuel on the support, said walls adjacent to the fuel bed being made of non-metallic refractory blocks, said blocks having enlarged interior air chambers open at the rear or exterior faces thereof and a plurality of conical passages extending from each of said air chambers through the block to the fuel bed and with the larger end of said passages on the side of the block remote from the air chambers, and means for supplying relatively cool air under forced draft to said air chambers and passages.

4. In a furnace, a fuel support, fixed walls for confining the fuel on the support, the area of said walls adjacent to the fuel bed being made of non-metallic refractory blocks, said blocks being formed with a relatively thin front wall with interior air chambers opening into the rear thereof and one or more passages extending from each said air chamber through said front wall to the fuel bed.

5. In a furnace, a fuel support, fixed walls for confining the fuel on the support, the area of said walls adjacent to the fuel bed being made of non-metallic refractory blocks, said blocks being formed with relatively thin front walls with interior air chambers opening into the rear thereof, and one or more passages extending from said air chambers through said front walls to the fuel bed, and means for supplying relatively cool air under forced draft to said air chambers and passages.

6. In a furnace, a fuel support, fixed walls for confining the fuel on the support, the area of said walls adjacent to the fuel bed being made of non-metallic refractory blocks, said blocks being formed with relatively thin front walls with one or more passages therethrough and web portions extending rearwardly to constitute thermal-conducting means, and means for supplying relatively cool air under forced draft to said web portions and said passages.

7. In a furnace, a fuel support, fixed walls for confining the fuel on the support, the face of said walls adjacent to the fuel bed being made of carborundum blocks, said blocks being formed with relatively thin front walls with interior air chambers opening into the rear thereof, one or more conical passages extending from each said air chamber through said front walls to the fuel bed and with the larger end terminating at the fuel contacting face, and means for supplying relatively cool air under forced draft to said air chambers and passages.

8. In a furnace, a fuel support, fixed walls for confining the fuel on the support, said walls being made of carborundum blocks and each block having relatively thin front walls, one or more conical passages through said walls and with the larger end terminating at the fuel contacting face and web portions extending rearwardly therefrom to constitute thermal-conducting means, and means for supplying relatively cool air under forced draft to said web portions and said passages.

In testimony whereof, I have signed my name to this specification.

BENJAMIN H. SNOW.